US012705626B2

(12) United States Patent
Singh et al.

(10) Patent No.: US 12,705,626 B2
(45) Date of Patent: Aug. 11, 2026

(54) SYSTEM AND METHOD FOR VALIDATING A GENUINE TRANSACTION CARD

(71) Applicant: Mastercard International Incorporated, Purchase, NY (US)

(72) Inventors: Sachin Kumar Singh, Pune (IN); Kaushal Shetty, O'Fallon, MO (US); Mayank Joshi, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/909,679

(22) Filed: Oct. 8, 2024

(65) Prior Publication Data

US 2026/0099848 A1 Apr. 9, 2026

(51) Int. Cl.
*G06Q 20/40* (2012.01)
*G06Q 20/34* (2012.01)

(52) U.S. Cl.
CPC ....... *G06Q 20/4016* (2013.01); *G06Q 20/357* (2013.01)

(58) Field of Classification Search
CPC ................. G06Q 20/357; G06Q 20/401–4016
See application file for complete search history.

(56) References Cited

U.S. PATENT DOCUMENTS 8,879,783 B1 11/2014 Wang et al.
12,112,220 B1 * 10/2024 Tessler .................. G06V 10/95
2014/0052636 A1 * 2/2014 Mattes ................. G06Q 20/409 705/44
2014/0270329 A1 * 9/2014 Rowley ................ G06Q 20/102 382/100
2015/0127547 A1 * 5/2015 Powell ............... G06Q 20/4016 705/67
2016/0140536 A1 * 5/2016 Abulafia ............. G06Q 20/326 705/40
2019/0378050 A1 * 12/2019 Edkin .................... G06N 20/20
2021/0110396 A1 * 4/2021 Farivar ................ G06Q 20/409
2021/0158035 A1 5/2021 Neeman et al.
2022/0108121 A1 4/2022 Das et al.
2022/0139143 A1 * 5/2022 Avitan ................... G07D 7/164 382/112
2023/0119385 A1 4/2023 Fenichel et al.
2023/0134651 A1 5/2023 Agbamu
2023/0385831 A1 * 11/2023 Fyfe ..................... G06Q 20/202

* cited by examiner

*Primary Examiner* — Eric T Wong
(74) *Attorney, Agent, or Firm* — Hovey Williams LLP

(57) ABSTRACT

A system and method for validating a genuine transaction card. A request to validate a transaction card is received from a merchant application running on a mobile device. In response to the request, a validator service module performs a liveliness check of the transaction card. The validator service module receives, via a data streaming engine, transaction card image data of the transaction card. The data streaming engine does not store the transaction card image data in a memory of the mobile device. An AI validation model extracts one or more transaction card features from the transaction card image data. The AI validation model determines an anomaly risk score based on the extracted transaction card features. The AI validation model validates the transaction card based on the anomaly risk score being less than a predetermined threshold value.

14 Claims, 5 Drawing Sheets

SYSTEM AND METHOD FOR VALIDATING A GENUINE TRANSACTION CARD

BACKGROUND

The present invention relates to systems and methods for detecting and preventing financial fraud, and more particularly, for identifying a genuine transaction card from a simulated, such as artificial intelligence (AI) generated, transaction card.

With the increased availability of AI generative tools, it is becoming difficult to identify a genuine transaction card vs. an AI-generated transaction card. This is especially true in instances where a cardholder may upload an image of their transaction card on a merchant application for tokenization and/or payment. In such a scenario, it is difficult to distinguish an AI-generated transaction card image from a genuine transaction card having similar features. While basic processes exist for a user to prove himself or herself in front of a camera if the application challenges the user with a liveliness check, the same is not available for transaction cards. Additionally, scanning a cardholder's transaction card so the cardholder may upload the image on a merchant application for tokenization and/or payment results in the captured transaction card image being stored or cached locally on the cardholder's mobile device in a merchant designated storage area before tokenization. This may result in a malicious application installed on the cardholder's mobile device having access to the transaction card image data, which only eases the generation of AI-generated transaction cards by providing a high-quality image set for modification.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided. The system includes one or more processors and a memory. The memory includes a validator service module and computer-executable instructions stored thereon. The validator service module includes an artificial intelligence (AI) validation module, a data streaming engine, and a token bindings module. The computer-executable instructions, when executed by the one or more processors, cause the one or more processors to perform the operation of receiving, via the validator service module, a request to validate a transaction card from a merchant application running on a mobile device. The one or more processors performing a liveliness check of the transaction card via the validator service module in response to the request. Furthermore, the one or more processors receive, by the validator service module via the data streaming engine, transaction card image data including one or more images of the transaction card. The data streaming engine does not store the transaction card image data in a memory of the mobile device. The one or more processors also extract, from the transaction card image data using the AI validation model, one or more transaction card features and determine, via the AI validation model and based on the extracted one or more transaction card features, an anomaly risk score. Furthermore, the one or more processors validate, via the AI validation model, the transaction card based on the anomaly risk score being less than a predetermined threshold value.

In a second aspect, a method is provided. the method is performed by a validator service module. The validator service module includes an artificial intelligence (AI) validation module, a data streaming engine, and a token bindings module. The method includes receiving a request to validate a transaction card from a merchant application running on a mobile device. The method also includes performing, in response to the request, a liveliness check of the transaction card. Furthermore, the method includes receiving, via the data streaming engine, transaction card image data including one or more images of the transaction card. The data streaming engine does not store the transaction card image data in a memory of the mobile device. Additionally, the method includes extracting, from the transaction card image data using the AI validation model, one or more transaction card features, and determining, via the AI validation model and based on the extracted one or more transaction card features, an anomaly risk score. The method also includes validating, via the AI validation model, the transaction card based on the anomaly risk score being less than a predetermined threshold value.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
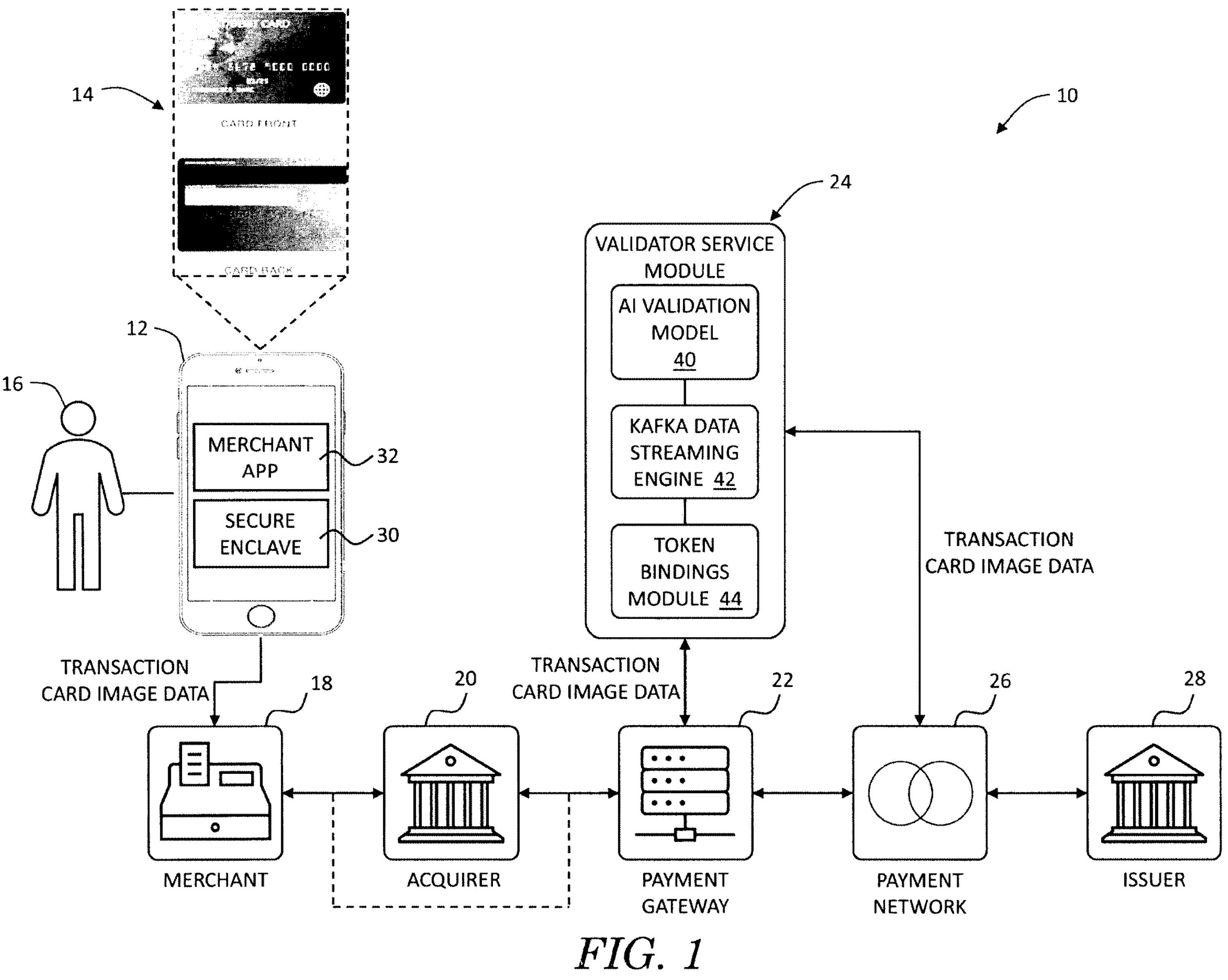
FIG. 1 is a block diagram of an embodiment of a system for identifying a genuine transaction card from a simulated, such as artificial intelligence (AI) generated, transaction card, in accordance with an aspect of the disclosure.
Figure 3:
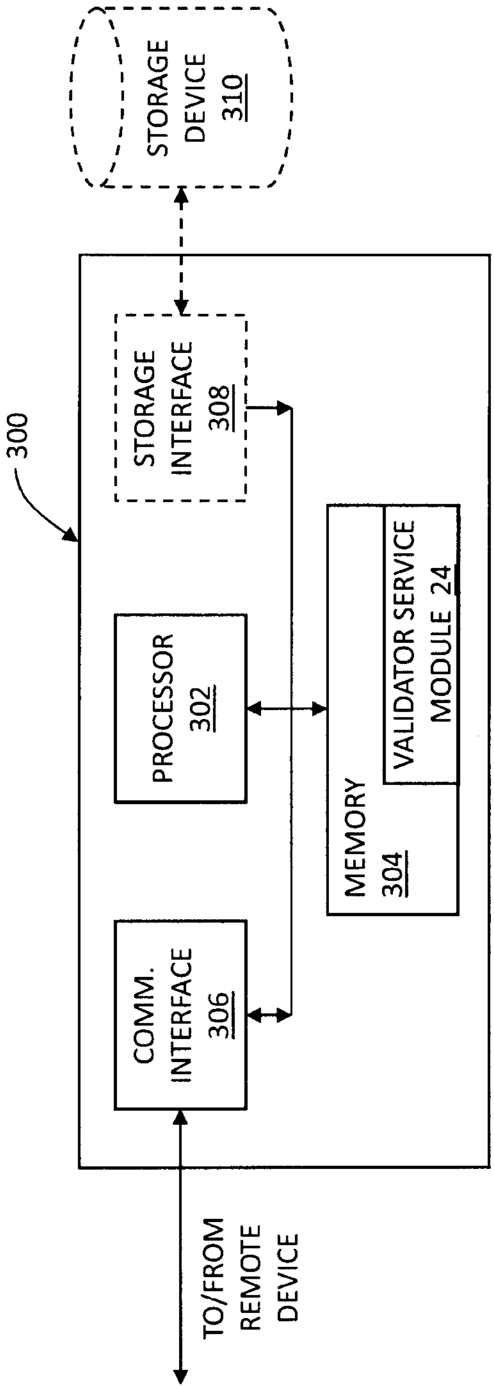
Figure 4:
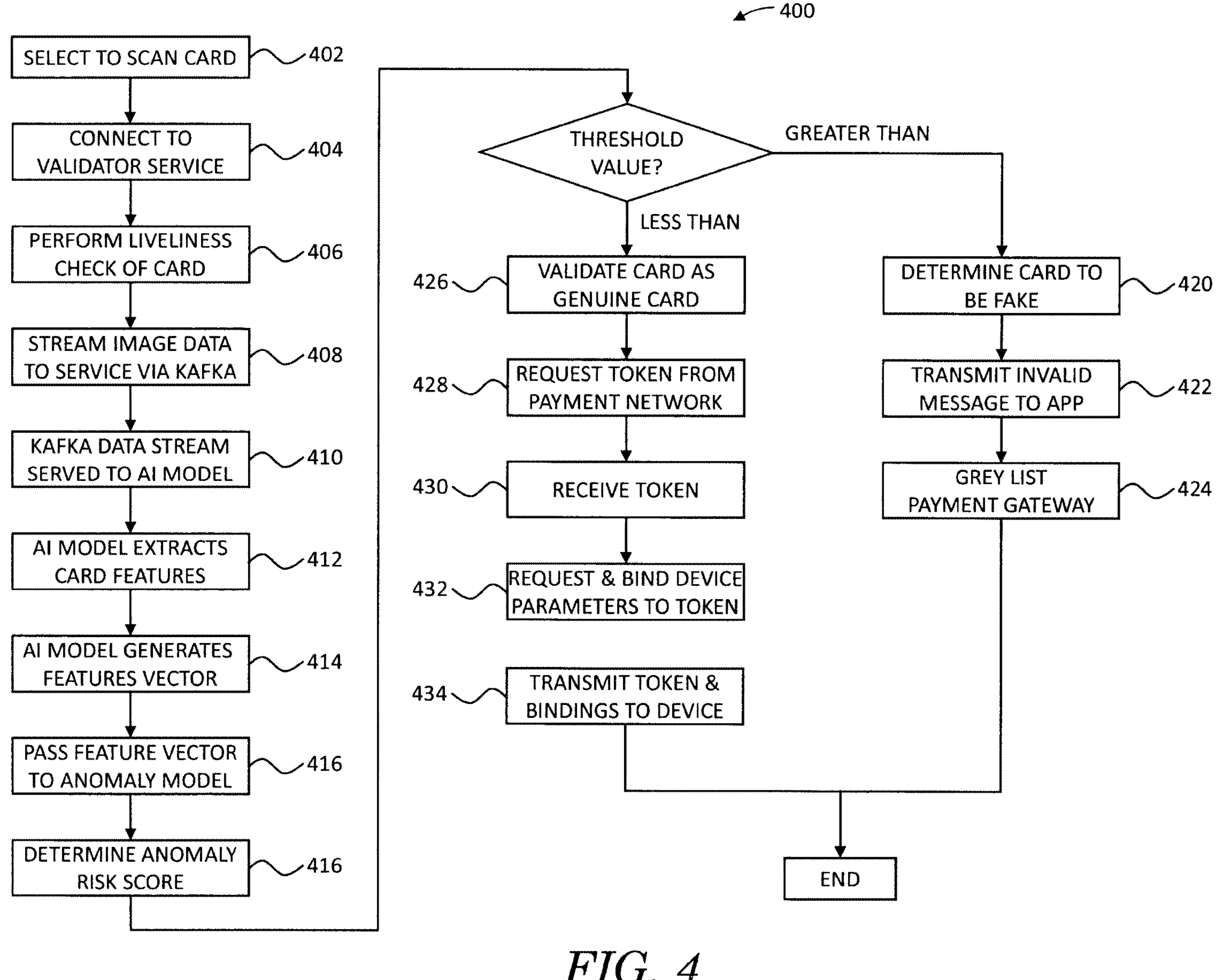
Figure 5:
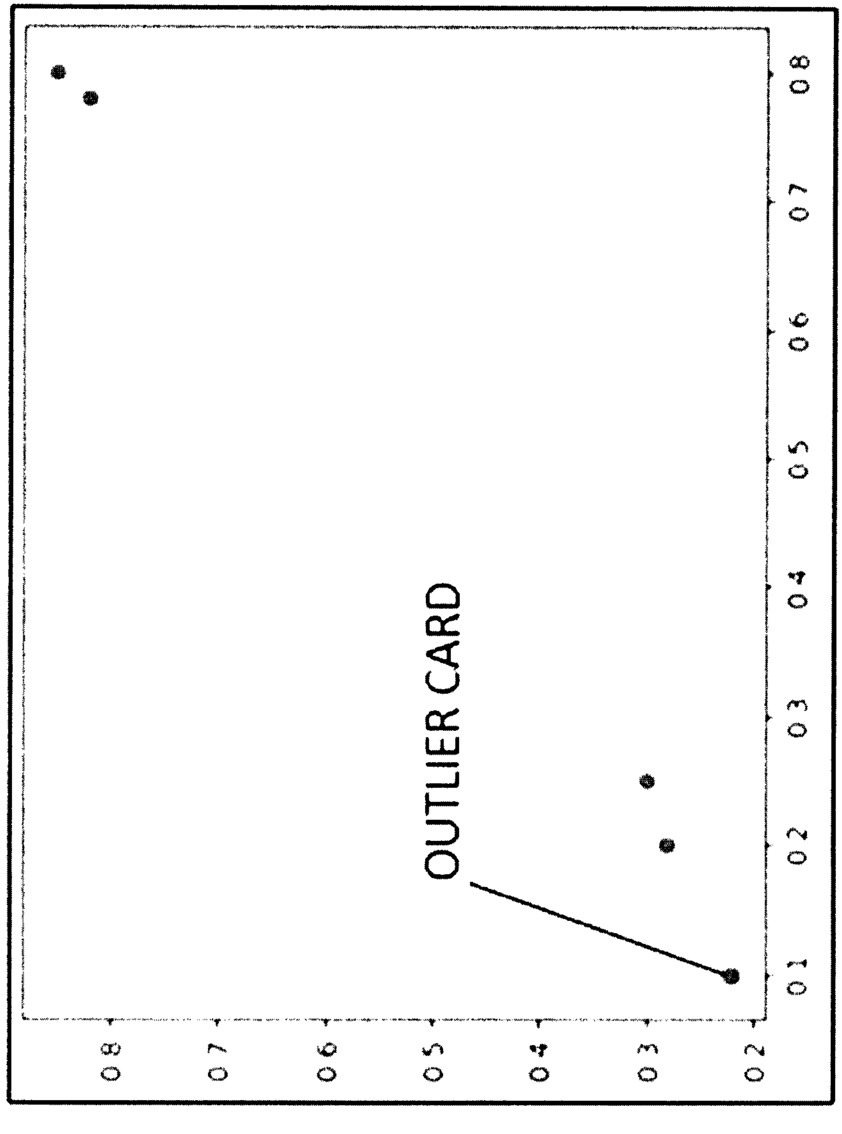

FIG. 3 is an example configuration of a computing system that may be configured to execute the validator service module of the system of FIG. 1; and FIG. 4 is a flowchart illustrating an exemplary computer-implemented method for identifying a genuine transaction card from a simulated, such as artificial intelligence (AI) generated, transaction card; and FIG. 5 is a simple two-dimensional (2D) graph of an anomaly detection model output based on analysis of four (4) genuine transaction cards and one (1) simulated transaction card.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

Exemplary System

Referring to FIG. 1, an embodiment of a system 10 for identifying a genuine transaction card from a simulated, such as artificial intelligence (AI) generated, transaction card is shown. If a cardholder is using a "scan your card" feature or "upload card image" feature of a merchant application or digital wallet application, the system 10 advantageously helps to protect next-generation digital consumers via an AI driven liveliness check, thereby reducing fraud via their mobile devices, transaction cards, or any other ecommerce financial accounts.

In the example embodiment, the system 10 may broadly include a cardholder mobile device 12 and a transaction card 14 associated with a cardholder 16, a merchant 18, an acquirer 20, a payment gateway 22, a validator service module 24, a payment network 26, and an issuer 28. The mobile device 12 may further include a secure enclave 30 and a digital wallet application and/or merchant application 32. The validator service module 24 may further include an AI validation model 40, a data streaming engine 42, and a token bindings model 44. In an embodiment, the function of the system 10 may be reflected in the steps of the method 400 described below and may include any additional features described in association with method 400.

The data streaming engine 42 may include Apache Kafka®. (Apache® and Kafka© are registered trademarks of The Apache Software Foundation, Wilmington, DE). Kafka is primarily used to build real-time streaming data pipelines and applications that adapt to the data streams.

The merchant application 32 may be installed and executable on the mobile device 12. The merchant application 32 may be associated with and issued by the merchant 18 for the browsing and purchase of goods and services offered by the merchant. In an embodiment, the cardholder 16 may download the merchant application 32 and install it on their mobile device 12. For example, the cardholder 16 may connect to the merchant 18, which may instruct the cardholder 16 to download the merchant application 32 to the mobile device 12 for direct communication with the merchant 18, e.g., without use of a web browser. Alternatively, the merchant application 32 may be executable on the mobile device 12 via a web browser, for example, when the cardholder 16 is browsing the merchant's virtual storefront. When the cardholder 16 uses the merchant application 32, a direct link may be established via a network connection to the merchant 18. The mobile device 12, such as a web-based smartphone, may be configured to execute for display the merchant application 32. In some embodiments, the merchant application 32 may be stored in a cloud-based interface, which may include cloud storage capability as well as any cloud-based application programming interface (API) that facilitates communication between the mobile device 12 and the merchant 18. The merchant application 32 may facilitate transmitting and receiving data between the mobile device 12 and the merchant 18 to purchase goods and services provided by the merchant 18. It is noted that while the merchant application 32 is described herein with respect to the methods and systems disclosed, a digital wallet application may be substituted for the merchant application 32. A digital wallet application may be merchant independent.

The secure enclave 30 may be configured to separate and protect sensitive code and data from other processes running on the mobile device 12. In the example embodiment, the secure enclave 30 operates as a trusted execution environment (TEE). A TEE is a secure area of a main processor that guarantees confidentiality and integrity of code and data loaded inside. The TEE, as an isolated execution environment, provides security features such as isolated execution, integrity of applications executing with the TEE, along with confidentiality of their assets. The TEE (or secure enclave 30) may be a hardware, software, or firmware component (e.g., Trusted Computing Group (TCG) Trusted Platform Module (TPM), Trusted Execution Environment (TEE), Virtual TPM, Intel® Software Guard Extension (SGX), Intel® Enhanced Privacy ID (EPID), Arm TrustZone, SIM card based on Java Card technology, etc.). The secure enclave 30 may provide a set of trusted functions that execute in the TEE on the mobile device 12. The trusted functions may include, for example, device identification, key generation, encrypt, decrypt, sign and verify operations, etc.

The secure enclave 30 may ensure that sensitive data is stored, processed, and protected in a trusted environment. In some embodiments, the secure enclave 30 may be tamperproof. For example, the secure enclave 30 may include tampering evidence capability (for tamper-proofing), which is a desired security function for storing encryptions keys, authentication credentials, and/or payment credentials. The ability of the secure enclave 30 to offer safe execution of cryptographic functions for authorized security software, which are sometimes referred to as "trusted applications," enables the secure enclave 30 to provide end-to-end security by enforcing protection, confidentiality, integrity, and data access rights.

The validator service module 24 may be configured to receive transaction card image data from the merchant application 32 (or digital wallet application). For example, the merchant application 32 may connect to the validator service module 24 via a network connection established with the payment gateway 22 or through the acquirer 20. When the cardholder 16 performs a "scan your card" feature or "upload card image" feature provided by the merchant application 32, the merchant application 32 may live-stream transaction card image data directly to the validator service module 24 for card validation. In the exemplary embodiment, the merchant application 32 may be configured to connect to the data streaming engine 42, wherein the merchant application 32 may capture and stream the transaction card image data in real-time directly to the validator service module 24 without storing or caching the transaction card image data locally on the mobile device 12.

The transaction card image data may include one or more images of the transaction card 14. The one or more images may include individual snapshots or represent a video clip of the transaction card 14. The one or more images may be directed to different parts of the transaction card 14. For example, one image may show a chip or micromodule of the transaction card 14, while another image may show a magnetic strip of the transaction card 14. The one or more images may also have differing pixel quality or image resolution. For example, one image may include low-resolution image (such as 72 pixels per inch (PPI)), while another image may include a high-resolution image (such as 300 PPI).

The validator service module 24 may be further configured to challenge the cardholder 16 with an AI-driven liveliness check of the transaction card 14. For example, the validator service module 24 may prompt the cardholder 16 to move or tilt the transaction card 14 during use of the "scan your card" feature or "upload card image" feature of the merchant application 32 (or digital wallet application) to facilitate detection and extraction of various features from the live-streamed image data of the transaction card.

Furthermore, validator service module 24 may be configured to transmit the transaction card image data to the payment network 26 after it is validated. Additionally, the validator service module 24 may be configured to receive, from the payment network 26, one or more tokens associated with the transaction card 14 contained in the transaction card image data.

The AI validation model 40 may be configured to parse each image of the transaction card image data and extract one or more transaction card features associated with the image of the transaction card 14 therefrom. For example, the AI validation model 40 may be configured to extract 1) pixel values of the front and back surfaces of the transaction card, 2) color features or values of the front and back surfaces of the transaction card, 3) texture features, such as texture histogram to identify image patterns, etc., 4) edge detection features to identify a gradient magnitude or edge density, 5) shape features to identify an aspect ratio of the transaction card, and 6) scale-invariant feature transform (SIFT) key-points.

The AI validation model 40 may also be configured to perform anomaly detection using an isolation forest based anomaly detection method. For example, the AI validation model 40 may be configured to determine a feature score for each of the extracted features of the real-time transaction card image data. The feature scores may be arranged into a feature vector indicative of the image data. The feature vector may be passed through a trained isolation forest machine learning model trained using transaction card image data of millions of legitimate transaction card images and designs. The isolation forest model may be configured to detect anomalies in the provided image data based on outlier detection (how easily a point can be removed from the population). The isolation forest model may assign an "anomaly risk score" based on how isolated the transaction card's features are compared to the legitimate transaction card training data. Anomaly risk scores that exceed a predetermined threshold value may indicate a potential fake or AI-generated transaction card, as their feature patterns may deviate significantly from the norm. The isolation forest method used in the present disclosure is an anomaly detection model based on the idea of binary tree division and has no requirements on the dimension and linear characteristics of the transaction card image data. In view of the characteristics of strong nonlinearity and the massive and high-dimensional transaction card image data of millions of transaction card designs, transaction card image anomalies or abnormalities can be detected quickly and accurately.

In the example embodiment, the trained AI validation model 40 may include a multipronged AI model and may employ a neural network algorithm. The isolation forest model may be a supervised machine learning component of the AI validation model 40 used to validate a genuine transaction card from an AI-generated transaction card image. The AI validation model 40 may be configured to provide an "anomaly risk score" for each transaction card analyzed via the live-streamed transaction card image data processed by the model.

In a specific example of a neural network, the neural network may be constructed of an input layer and an output layer, with a number of "hidden" layers therebetween. Each of these layers may include a number of distinct nodes. Each node of the input layer may be connected to the nodes of the first hidden layer. The nodes of the first hidden layer then may be connected to the nodes of the following hidden layer or, in the event that there are no further hidden layers, the output layer. However, while, in this specific example, the nodes of the input layer may be described as each being connected to the nodes of the first hidden layer, it will be appreciated that the present disclosure is not particularly limited in this regard. Indeed, other types of neural networks may be used in accordance with embodiments of the disclosure as desired depending on the situation to which embodiments of the disclosure are applied.

Each node of the neural network may take a number of inputs and produce an output based on those inputs. The inputs of each node may have individual weights applied to them. The inputs (such as the features of the transaction card images) may then be processed by the hidden layers using weights, which may be adjusted during training. The output layer may produce a prediction from the neural network (which varies depending on the input that was provided).

In examples, during training, adjustment of the weights of the nodes of the neural network may be achieved through linear regression models. However, in other examples, logistic regression can be used during training. Basically, training of the neural network may be achieved by adjusting the weights of the nodes of the neural network in order to identify the weighting factors which, for the training input data provided, produce the best match to the actual data which has been provided.

In other words, during training, both the inputs and target outputs of the neural network may be provided to the model to be trained. The model then processes the inputs and compares the resulting output against the target data (i.e., sets of transaction card image data that are known to include invalid card images). Differences between the output and the target data are then propagated back through the neural network, causing the neural network to adjust the weights of the respective nodes of the neural network. However, in other examples, training can be achieved without the outputs, using constraints of the system during the optimization process.

Once trained, new input data may then be provided to the input layer of the trained AI validation model 40, which will cause the trained AI validation model to generate (on the basis of the weights applied to each of the nodes of the neural network during training) a predicted output for the given input data (being an anomaly risk score or prediction of whether the transaction card in the image data is authentic or simulated (e.g., AI-generated)).

However, it will be appreciated that the neural network described here is not particularly limiting to the present disclosure. More generally, any type of machine learning model or machine learning algorithm can be used in accordance with embodiments of the disclosure.

The data streaming engine 42 may be configured to ingest the transaction card image data captured by the mobile device 12 into the AI validation model 40 for processing, as described above. Furthermore, the data streaming engine 42 may be configured to transfer the transaction card image data directly to the payment network 26 for tokenization, after the AI validation model 40 validates the transaction card, such as the transaction card 14, depicted in the transaction card image data. In an exemplary embodiment, the merchant application 32 (or digital wallet application) may be configured to receive the transaction card image data via an input device (such as input device 212 of FIG. 2) of the mobile device 12 and utilize the data streaming engine 42 to transmit the transaction card image data to the validator service module 24. Similarly, the validator service module 24 may be configured to utilize the data streaming engine 42 to transmit the transaction card image data to the payment network 26. The data streaming engine 42 can realize real-time transmission of extremely large amounts of transaction card image data because of its characteristics of high availability, persistent storage of data, high throughput, low latency, and scalability.

The token bindings module 44 may be configured to receive a token (i.e., a payment token) corresponding to the transaction card 14 contained in the validated transaction card image data. The token bindings module 44 may be configured to generate one or more token bindings that bind the token to the mobile device 12. For example, the token bindings module 44 may be configured to retrieve and embed or link one or more device parameters of the mobile device 12, such as a near field communication identifier (NFC ID), a secure enclave or secure element ID, an operating system ID (e.g., an Android or iOS ID), a media access control (MAC) address, and/or device serial number, to the token. The token bindings module 44 may be configured to transmit the token with the embedded token bindings to the mobile device 12 for storage in the secure enclave 30. The token bindings may ensure that the token is only usable by the digital wallet application or merchant application 32 on the mobile device 12.

Exemplary Computer Systems

Figure 2:
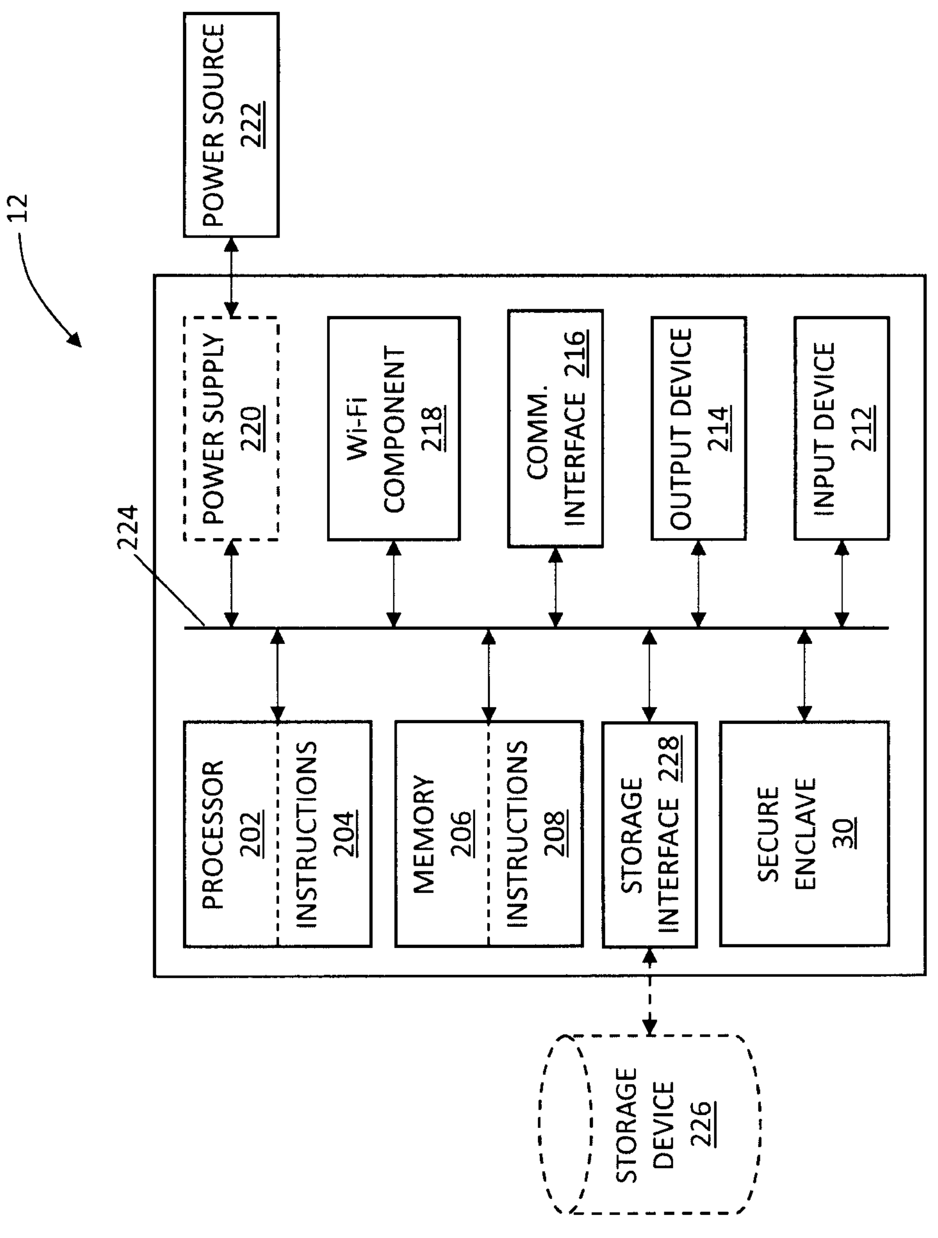
FIG. 2 is an example configuration of a cardholder mobile device for use with the system of FIG. 1.

FIG. 2 is an example configuration of the cardholder mobile device 12. In the exemplary embodiment, the mobile device 12 may be a computing device configured to run the digital wallet application and/or merchant application 32 (shown in FIG. 1) and connect to the merchant 18 (shown in FIG. 1) or any other computing device, for example, via one or more communication networks.

In the exemplary embodiment, the mobile device 12 may generally include one or more processors 202, a memory device 206, a secure enclave 30, an input device 212, an output device 214, a communication interface 216, an integrated Wi-Fi component 218 (e.g., implementing the Institute of Electrical and Electronics/IEEE 802.11 family of standards), each of which may communicate with each other component over an interconnect 224 (e.g., a bus). Optionally, the mobile device 12 may include an internal power supply 220 (e.g., a battery or other self-contained power source). Alternatively, in some embodiments, the mobile device 12 may include an external power source 222.

The one or more processors 202 may include one or more processing units (e.g., in a multi-core configuration) specially programmed for executing computer readable instructions, such as instructions 204. The instructions 204 may be executed within a variety of different operating systems (OS) on the mobile device 12, such as UNIX, LINUX, Microsoft Windows®, etc. More specifically, the instructions may cause various data manipulations on data stored in the memory device 206 (e.g., create, read, write, update, and delete procedures). It should also be appreciated that upon initiation of a computer-based method, various instructions 204 may be executed during initialization. Some operations may be required to perform one or more processes described herein, while other operations may be more general and/or specific to a programming language (e.g., C, C#, C++, Java, or other suitable programming languages, etc.). The memory device 206 may be any device allowing information such as cryptographic keys, executable instructions 208, and/or other data to be stored and retrieved. The memory device 206 may include one or more computer readable media.

In the example embodiment, the processor 202 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic functions, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the mobile device 12 may be widely deployed, it may be impractical to manually update software installed on the mobile device 12. Therefore, the system 10 may provide a mechanism for automatically updating the software on the mobile device 12. For example, an updating mechanism may be used to automatically update any number of components and their drivers, both network and non-network components, including system level (OS) software components. In some embodiments, the mobile device 12 components may be dynamically loadable and unloadable; thus, they may be replaced in operation without having to reboot the OS.

The memory device 206 may be any type of memory device that enables the mobile device 12 to function as described herein. For example, the memory device 206 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In some embodiments, the memory device 206 may include two or more memory devices and may be of any number of different package types such as single die package (SDP), dual die package (DDP) or quad die package (Q17P). The memory device 206, in some examples, may be directly soldered onto a motherboard (not shown) and/or may be configured as one or more memory modules that couple to the motherboard via a connector. Any number of other memory implementations may be used, such as other types of memory modules, including, but not limited to, read-only memory (ROM), erasable programmable read-only memory (EPROM), electrically erasable programmable read-only memory (EEPROM), and non-volatile RAM (NVRAM).

The above memory types are exemplary only and are thus not limiting as to the types of memory usable for storage of a computer program.

The secure enclave 30, described more fully above, may ensure that sensitive data is stored, processed, and protected in a trusted environment. In some embodiments, the secure enclave 30 may be tamper-proof. For example, the secure enclave 30 may include tampering evidence capability (for tamper-proofing), which is a desired security function for storing encryptions keys, authentication credentials, and/or payment credentials and tokens. The ability of the secure enclave 30 to offer safe execution of cryptographic functions for authorized security software, which are sometimes referred to as "trusted applications," enables the secure enclave 30 to provide end-to-end security by enforcing protection, confidentiality, integrity, and data access rights.

Stored in the memory device 206 are, for example, computer readable instructions 208 for providing a user interface to a user via the output device 214 and, optionally, receiving and processing input from the input device 212. A user interface may include, among other possibilities, a web browser and a software application. Web browsers enable users to view and interact with media and other information typically embedded on a web page or a website. A software application allows the user to interact with a server application, for example, associated with the merchant 18.

The input device 212 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both the output device 214 and the input device 212.

The input device may also include a photographic element. The photographic element may include a camera or other optical sensor and lens combination capable of generating a video signal and capturing an image, iris scan, and the like. In various embodiments, the photographic element may be integrated in a housing or body of the mobile device 12.

The mobile device 12 may also include a communication interface 216, which is communicatively connectable to a remote device such as the merchant 18. The communication interface 216 may provide, for example, a wired communication to a communication network or to other devices. The wired communication may provide an Ethernet connection or may be based on other types of networks, such as Controller Area Network (CAN), Local Interconnect Network (LIN), DeviceNet, ControlNet, etc. Wireless communication between the mobile device 12 and other devices is also contemplated (see below).

In the example embodiment, the output device 214 may include, for example, and without limitation, a liquid crystal display (LCD), an organic light emitting diode (OLED) display, or an "electronic ink" display. In some embodiments, a single component such as a touch screen may function as both an output device (e.g., the output device 214) and the input device 212. As such, the output device 214 may optionally include a touch controller for support of touch capability. In such embodiments, the mobile device 12 may detect a user's presence by detecting that the user has touched the output device 214 of the mobile device 12.

The Wi-Fi component 218 (broadly, a communication interface) may be communicatively connectable to a remote device such as the merchant 18. The Wi-Fi component 218 may include, for example, a wireless network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

The processor 202 may be operatively coupled to a storage device 226. The storage device 226 may be any computer-operated hardware suitable for storing and/or retrieving data, such as data encryption keys described herein. In some embodiments, the storage device 226 may be integrated into the mobile device 12. In other embodiments, the storage device 226 may be external to the mobile device 12. For example, the mobile device 12 may include one or more hard disk drives that function as the storage device 226. In other embodiments, where the storage device 226 may be external to the mobile device 12, the storage device 226 may be accessed by a plurality of mobile devices and computing systems. For example, the storage device 226 may include multiple storage units such as hard disks or solid-state disks in a redundant array of inexpensive disks (RAID) configuration. The storage device 226 may include a storage area network (SAN) and/or a network attached storage (NAS) system.

In some embodiments, the processor 202 may be operatively coupled to the storage device 226 via a storage interface 228. The storage interface 228 may be any component capable of providing the processor 202 with access to the storage device 226. The storage interface 228 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the storage device 226.

In some embodiments, the mobile device 12 may be connected to one or more peripheral devices (not shown). That is, the mobile device 12 may communicate various data with one or more peripheral devices. For example, the mobile device 12 may communicate with one or more peripheral devices through the Wi-Fi component 218, the communication interface 216, or other suitable means.

FIG. 3 is an example configuration of a computing system 300 that may be configured to execute the validator service module 24. In the example embodiment, the system 300 may include a processor 302 for executing instructions. The instructions may be stored in a memory 304, for example. The processor 302 may include one or more processing units (e.g., in a multi-core configuration) for executing the instructions. The instructions may be executed within a variety of different operating systems on the computing system 300, such as UNIX, LINUX, Microsoft Windows®, etc. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 302 may be operatively coupled to a communication interface 306 such that the computing system 300 can communicate with a remote device such as the mobile device 12 (shown in FIG. 1), the payment gateway 22 (shown in FIG. 1), the payment network 26 (shown in FIG. 1), and/or other computing systems. For example, the communication interface 306 may receive communications from the mobile device 12 and/or the merchant 18 via the Internet.

The processor 302 may be operatively coupled to the storage device 310. The storage device 310 may be any computer-operated hardware suitable for storing and/or retrieving data. In some embodiments, the storage device 310 may be integrated in the system 300. In other embodiments, the storage device 310 may be external to the system 300. For example, the system 300 may include one or more hard disk drives as the storage device 310. In other embodiments, the storage device 310 may be external to the system 300 and may be accessed by a plurality of computing systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 may be operatively coupled to the storage device 310 via a storage interface 308. The storage interface 308 may be any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Computer-Implemented Methods

FIG. 4 is a flowchart illustrating an exemplary computer-implemented method 400 for identifying a genuine transaction card from a simulated, such as AI-generated, transaction card, in accordance with embodiments of the present disclosure. When a cardholder triggers a "scan your card" feature or "upload card image feature" of a merchant application on his or her mobile device, such as the mobile device 12 (shown in FIG. 1), the method 400 advantageously helps protect the cardholder via an AI-driven liveliness check, thereby reducing fraud via their mobile devices, transaction cards, or any other ecommerce financial accounts. The operations described herein may be performed in the order shown in FIG. 4 or may be performed in a different order. Furthermore, some operations may be performed concurrently as opposed to sequentially. In addition, some operations may be optional.

The computer-implemented method 400 is described below, for ease of reference, as being executed by exemplary devices and components introduced with the embodiments illustrated in FIGS. 1-3. In one embodiment, the method 400 may be implemented by the system 10 (shown in FIG. 1). The method 400 may be implemented on other computing devices and/or systems through the utilization of processors, transceivers, hardware, software, firmware, or combinations thereof. A person having ordinary skill will further appreciate that responsibility for all or some of the actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the operations outlined herein. The program(s) stored on the computer-readable medium(s) may instruct the processor or processing units to perform additional, fewer, or alternative actions, including those discussed elsewhere herein.

A cardholder, such as the cardholder 16 (shown in FIG. 1), may execute or run a payment application, such as the digital wallet application or merchant application 32 (shown in FIG. 1), on his or her mobile device, such as the mobile device 12 (shown in FIG. 1). In an example, the cardholder 16 may be browsing a merchant's virtual storefront, such as a storefront of the merchant 18 (shown in FIG. 1). The cardholder may select one or more goods or services for purchase. The cardholder 16 may then proceed to checkout and purchase the goods or services using the digital wallet application or the merchant application 32.

At operation 402, the cardholder may select a "scan your card" or "upload card image" feature of the digital wallet application or merchant application 32 to have his or her transaction card, such as the transaction card 14 (shown in FIG. 1), scanned, uploaded, and validated, before being tokenized. In an embodiment, upon selection of the a "scan your card" or "upload card image" feature, the digital wallet application or merchant application 32 may present a scan card screen that displays a real-time or "live" video stream by activating the photographic element 212 (i.e., the input device, shown in FIG. 2) of the mobile device 12. This enables the cardholder 16 to visually position his or her physical transaction card 14 in view of the photographic element 212.

At operation 404, upon selection of the "scan your card" or "upload card image" feature, the digital wallet application or merchant application 32 may connect to the validator service module 24, for example, via a secure application programming interface (API) or any other secure connection, and request validation of the transaction card 14. The digital wallet application or merchant application 32 is configured to utilize the data streaming engine 42 to live stream transaction card image data to the validator service module 24 without storing or caching any of the transaction card image data locally in a memory of the mobile device 12. That is, the data streaming engine 42 may be configured to stream image data via the merchant application 32 without storing or caching any of the streaming data locally on the mobile device, ensuring that data only resides in transit.

An advantage of preventing local storage or caching of the transaction card image data is that the data is unavailable to any other application that may be stored on the mobile device 12. For example, if a malicious application were stored on the mobile device 12, it may be able to access the local storage or cache of the mobile device and surreptitiously capture or copy the image data. As described herein, the malicious application may include capabilities to create a replica of the transaction card 14 and use it for fraudulent activity. However, by live streaming the transaction card image data using the data streaming engine 42 while simultaneously preventing local storage of the transaction card image data, in any form, the transaction card image data is unavailable to any application, including malicious applications, that may be installed on the mobile device 12.

At operation 406, after connecting to the digital wallet application or merchant application 32 and in response to receiving the request to validate the transaction card 14, the validator service module 24 may challenge the cardholder 16 by performing a liveliness check of the transaction card 14. For example, the validator service module 24 may transmit to and present a prompt on the mobile device 12 via the digital wallet application or merchant application 32. The prompt may instruct the cardholder 16 to place the transaction card 14 within view of the photographic element 212 and to move, rotate, tilt, etc. the transaction card 14, during use of the "scan your card" feature or "upload card image" feature of the digital wallet application or merchant application 32, which may facilitate detection and extraction of various features from the live-streamed transaction card image data of the transaction card 14.

At operation 408, in an embodiment, the mobile device 12 transmits a live video or image stream of the transaction card 14, captured by the photographic element 212, via the data streaming engine 42. For example, in response to the prompt from the validator service module 24, the cardholder 16 may position the mobile device 12 and the transaction card 14 relative to each other to locate the four (4) bounding corners of the transaction card 14 within view of the photographic element 212. When the transaction card 14 is positioned as such, the digital wallet application or merchant application 32 may scan the transaction card 14, generating a live transaction card image data stream to the validator service module 24 via the data streaming engine 42.

At operation 410, the data streaming engine 42 serves (or transmits) the live-streamed transaction card image data to the AI validation model 40. At operation 412, upon receipt of the live-streamed transaction card image data, the AI validation model 40 may parse each image of the transaction card image data and extract one or more transaction card features associated with the image of the transaction card 14 therefrom. For example, the AI validation model 40 may perform one or more computer imaging representation techniques, including, without limitation, 1) determining pixel values of the front and back surfaces of the transaction card, 2) determining color features or values of the front and back surfaces of the transaction card, 3) determining texture features, such as texture histogram of the front and back surfaces of the transaction card to identify image patterns, etc., 4) determining edges of the transaction card based on a gradient magnitude or edge density, 5) determining shape features to identify an aspect ratio of the transaction card, and 6) determining scale-invariant feature transform (SIFT) keypoints.

Determining the pixel values may include performing a grayscale representation method of the front and back surfaces of the transaction card 14. The AI validation model 40 may convert each image of the transaction card image data to grayscale and the transaction card may be represented using a single channel where each pixel contains a grayscale value ranging from 0 (black) to 255 (white). The color features or values may be determined by representing each pixel in the RGB (Red, Green, Blue) format. Each pixel may be represented by three color channels (R, G, and B), with each channel containing an intensity value ranging from 0 to 255. Texture feature analysis finds patterns in images, like smooth or rough textures. For example, local binary pattern (LBP) histograms may be determined. The LBP method may encode the local structure of an image of the image data by comparing each pixel with its neighbors. This enables the computation of a local representation of texture. Another texture feature analysis technique includes using a Gabor filter bank, which is a set of Gabor filters with different frequencies and orientation. The Gabor filters are used to extract texture features from the image data by analyzing local spatial frequency content. The AI validation model 40 may perform an edge detection process on the captured image data to define the boundaries of the transaction card 14. This may include identifying a gradient magnitude or edge density, such as identifying points in the images of the image data with discontinuities, such as sharp changes in image brightness levels. The points where the image brightness varies sharply may be defined as edges (or boundaries). The shape feature analysis may include determining an aspect ratio of the transaction card 14, for example, based on either the outer edge detected pixels (the boundary) or the full filled-in binary shape of the transaction card. Additionally, the SIFT method may include identifying unique local features (i.e., keypoints) in the images, each of which is invariant to image translation, scaling, and rotation, partially invariant to illumination changes, and robust to local geometric distortion.

Once the transaction card features have been identified within the captured images, the AI validation model 40 may search for specific elements within the card shape. For example, the AI validation model 40 may perform an optical character recognition (OCR) process to extract text elements from the images, such as a primary account number (PAN), which may be used to determine where to transmit the transaction card data for tokenization upon validation.

At operation 414, the AI validation model 40 may determine a feature score for each of the one or more of the extracted features of the real-time transaction card image data and arrange the scores into a feature vector representative of the transaction card 14 identified in the image data. At operation 416, the AI validation model 40 may pass the feature vector representation of the transaction card 14 through a trained isolation forest machine learning model, as described above.

In an example, below is sample pseudocode for generating an anomaly detection model and processing card data for anomaly detection using feature vectors of five (5) transaction cards arranged in an array. The array includes four (4) genuine transaction cards and one (1) simulated, such as AI-generated, transaction card.

```
import numpy as np
from sklearn.ensemble import IsolationForest
cc_image = np.array([
  [0.25, 0.30, 0.40, 0.15, 0.60],
    [0.20, 0.28, 0.35, 0.22, 0.65],
     [0.10, 0.22, 0.33, 0.18, 0.50],
      [0.80, 0.85, 0.90, 0.75, 0.95],
       [0.78, 0.82, 0.88, 0.70, 0.92],
])
//creation of model
isolation_forest = IsolationForest(n_estimators=100, contamination=0.2,
random_state=42)
//Fitting the model to dataset
isolation_forest.fit(cc_image)
//Predicting outliers (anomalous images) in the given dataset
predict = isolation_forest.predict(cc_image)
anomalous_indice = np.where(predict == −1)[0]
//Display the indices of anomalous images
print(anomalous_indice)
output − 2
```

In the example above, the output indicates that the second feature vector of the supplied array of feature vectors is an outlier, i.e., a simulated or AI-generated card, in this example. The second feature vector was flagged based on a deviation from a majority of data points. FIG. 5 is a simple two-dimensional (2D) graph of model performance of the above example.

At operation 418, the AI validation model 40 may provide an "anomaly risk score," which may be determined by the isolation forest model based on the one or more extracted transaction card features. The anomaly risk score may be an indication of how anomalous, or how much the extracted transaction card features, deviate from genuine transaction card features used to train the isolation forest model.

AI validation model 40 may compare the anomaly risk score to a predetermined threshold value. If the anomaly risk score exceeds a predetermined threshold value, at operation 420, the transaction card included in the image data may be deemed to be a potential fake or AI-generated transaction card, as the feature patterns may deviate significantly from the norm. In such an instance, at operation 422, the validator service module 24 may transmit a message to the merchant 18 indicating that the transaction card is invalid. In addition, at operation 424, the validator service module 24 may add the payment gateway 22 and/or the merchant 18 to a "grey" list. The grey list may include payment gateways and/or merchants that have an increased risk of fraudulent transaction card-related activities associated therewith. As such, further transaction card validation requests from entities on the grey list may be subject to increased fraudulent screening and/or request denials.

If the anomaly risk score is below the predetermined threshold value, at operation 426, the transaction card included in the image data may be validated as a genuine transaction card. In such an instance, at operation 428, the validator service module 24 may transmit the transaction card image data and a request to tokenize the transaction card to the payment network 26, for example, using the data streaming engine 42. The validator service module 24 may use the extracted PAN to determine to which payment network to transmit the data and request.

In response to the tokenization request, at operation 430, the validator service module 24 may receive a payment token from the payment network 26. The payment token may represent the transaction card imaged in the data images provided by the validator service module 24 to the payment network 26.

At operation 432, the token bindings module 44 may retrieve and embed or link one or more device parameters of the mobile device 12, such as a near field communication identifier (NFC ID), a secure enclave or secure element ID, an operating system ID (e.g., an Android or iOS ID), a media access control (MAC) address, and/or device serial number, to the payment token. For example, upon receipt of the payment token by the validator service module 24, the token bindings module 44 may request the one or more device parameters of the mobile device 12 from the digital wallet application or merchant application 32. Upon receipt of the device parameters, the token bindings module 44 may embed (or otherwise link) the device parameters in the payment token. At operation 434, the validator service module 24 may transmit the payment token with the embedded token bindings to the mobile device 12 for storage in the secure enclave 30. The token bindings may ensure that the token is only usable by the digital wallet application or merchant application 32 on the mobile device 12.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this application, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A system comprising:

a secure enclave:

one or more processors; and a memory storing a validator service module and computer-executable instructions thereon, the validator service module including an artificial intelligence (AI) validation module, a token bindings module, and a data streaming engine, the computer-executable instructions, when executed by the one or more processors, causing the one or more processors to perform operations of:

receiving, via the validator service module, a request to validate a transaction card from a merchant application running on a mobile device;

in response to the request, performing, via the validator service module, a liveliness check of the transaction card;

receiving, by the validator service module via the data streaming engine, transaction card image data including one or more images of the transaction card, wherein the data streaming engine does not store the transaction card image data in a memory of the mobile device and does not store or cache the transaction card digital image locally on the mobile device in any form;

extracting, from the transaction card image data using the AI validation model, one or more transaction card features;

determining, via the AI validation model and based on the extracted one or more transaction card features, an anomaly risk score;

determining that the anomaly risk score is less than a predetermined threshold value;

validating, via the AI validation model, the transaction card based on the determination;

in response to validating the transaction card, transmitting, to a payment network associated with the transaction card via the data streaming engine, the transaction card image data and a request to tokenize the transaction card;

receiving, via the validator service module and in response to the request to tokenize the transaction card, a payment token from the payment network, the payment token being representative of the transaction card;

retrieving, via the token bindings module, one or more device parameters of the mobile device including a secure enclave ID;

embedding, via the token bindings module, the retrieved one or more device parameters to the payment token; and transmitting the payment token with the embedded token bindings to the secure enclave for storage on the mobile device.

2. The system in accordance with claim 1, the computer-executable instructions further causing the one or more processors to perform an operation of comparing, via the AI validation model, the anomaly risk score to the predetermined threshold value.

3. The system in accordance with claim 1, the operation of performing the liveliness check of the transaction card further includes presenting, by the validator service module via the merchant application, a prompt on the mobile device, the prompt including one or more instructions to move, rotate, and tilt the transaction card within view of a photographic element of the mobile device.

4. The system in accordance with claim 1, the extracted one or more transaction card features including one or more of the following:

pixel values of front and back surfaces of the transaction card, color features or values of the front and back surfaces of the transaction card, a texture histogram of the front and back surfaces of the transaction card, edge detection features to identify a gradient magnitude or edge density, shape features to identify an aspect ratio of the transaction card, and scale-invariant feature transform (SIFT) keypoints.

5. The system in accordance with claim 1, the computer-executable instructions further causing the one or more processors to perform an operation of determining a respective feature score for each of the extracted one or more transaction card features.

6. The system in accordance with claim 5, the computer-executable instructions further causing the one or more processors to perform an operation of arranging the respective feature scores into a feature vector representative of the transaction card.

7. The system in accordance with claim 6, the computer-executable instructions further causing the one or more processors to perform an operation of passing, via the AI validation model, the feature vector through a trained isolation forest machine learning model.

8. A method performed by a validator service module, the validator service module including an artificial intelligence (AI) validation module, a data streaming engine, and a token bindings module, the method comprising:

receiving a request to validate a transaction card from a merchant application running on a mobile device;

in response to the request, performing a liveliness check of the transaction card;

receiving, via the data streaming engine, transaction card image data including one or more images of the transaction card, wherein the data streaming engine does not store the transaction card image data in a memory of the mobile device and does not store or cache the transaction card digital image locally on the mobile device in any form;

extracting, from the transaction card image data using the AI validation model, one or more transaction card features;

determining, via the AI validation model and based on the extracted one or more transaction card features, an anomaly risk score;

determining that the anomaly risk score is less than a predetermined threshold value;

validating, via the AI validation model, the transaction card based on the determination;

in response to validating the transaction card, transmitting, to a payment network associated with the transaction card via the data streaming engine, the transaction card image data and a request to tokenize the transaction card;

receiving, via the validator service module and in response to the request to tokenize the transaction card, a payment token from the payment network, the payment token being representative of the transaction card;

retrieving, via the token bindings module, one or more device parameters of the mobile device including a secure enclave ID;

embedding, via the token bindings module, the retrieved one or more device parameters to the payment token; and transmitting the payment token with the embedded token bindings to a secure enclave of the mobile device for storage on the mobile device.

9. The method in accordance with claim 8 further comprising comparing, via the AI validation model, the anomaly risk score to the predetermined threshold value.

10. The method in accordance with claim 8, wherein the operation of performing the liveliness check of the transaction card includes presenting, by the validator service module via the merchant application, a prompt on the mobile device, the prompt including one or more instructions to move, rotate, and tilt the transaction card within view of a photographic element of the mobile device.

11. The method in accordance with claim 8, wherein the extracted one or more transaction card features includes one or more of the following:

pixel values of front and back surfaces of the transaction card, color features or values of the front and back surfaces of the transaction card, a texture histogram of the front and back surfaces of the transaction card, edge detection features to identify a gradient magnitude or edge density, shape features to identify an aspect ratio of the transaction card, and scale-invariant feature transform (SIFT) keypoints.

12. The method in accordance with claim 8 further comprising determining a respective feature score for each of the extracted one or more transaction card features.

13. The method in accordance with claim 12 further comprising arranging the respective feature scores into a feature vector representative of the transaction card.

14. The method in accordance with claim 13 further comprising passing, via the AI validation model, the feature vector through a trained isolation forest machine learning model.

* * * * *